United States Patent
Jeong et al.

(10) Patent No.: US 9,844,053 B2
(45) Date of Patent: Dec. 12, 2017

(54) DISTRIBUTED SCHEDULING METHOD AND APPARATUS FOR RESOURCE ALLOCATION FOR DEVICE TO-DEVICE COMMUNICATION

(71) Applicant: Samsung Electronics Co., Ltd, Gyeonggi-do (KR)

(72) Inventors: Su-Ryong Jeong, Yongin-si (KR); Hyun-Seok Ryu, Yongin-si (KR); Jeong-Ho Park, Seoul (KR); Hyun-Kyu Yu, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 283 days.

(21) Appl. No.: 14/708,858

(22) Filed: May 11, 2015

(65) Prior Publication Data

US 2015/0326492 A1    Nov. 12, 2015

(30) Foreign Application Priority Data

May 9, 2014    (KR) .......................... 10-2014-0055368

(51) Int. Cl.
| | |
|---|---|
| *H04W 72/04* | (2009.01) |
| *H04L 12/911* | (2013.01) |
| *H04W 74/08* | (2009.01) |
| *H04W 72/10* | (2009.01) |
| *H04L 12/64* | (2006.01) |
| *H04W 28/26* | (2009.01) |
| *H04W 72/12* | (2009.01) |

(52) U.S. Cl.
CPC ..... *H04W 72/0446* (2013.01); *H04L 12/6418* (2013.01); *H04L 47/72* (2013.01); *H04W 72/0486* (2013.01); *H04W 72/10* (2013.01); *H04W 74/0866* (2013.01); *H04W 74/0875* (2013.01); *H04W 28/26* (2013.01); *H04W 72/1205* (2013.01)

(58) Field of Classification Search
CPC ......... H04W 72/0446; H04W 74/0866; H04W 24/10; H04W 28/26; H04W 72/1205; H04W 74/0875; H04W 72/10; H04W 72/0486; H04L 12/6418; H04L 47/72
See application file for complete search history.

(56) References Cited

U.S. PATENT DOCUMENTS

| | | | |
|---|---|---|---|
| 2002/0163933 A1* | 11/2002 | Benveniste | H04L 47/10 370/465 |
| 2005/0276243 A1* | 12/2005 | Sugaya | H04W 28/26 370/328 |

* cited by examiner

*Primary Examiner* — Kwang B Yao
*Assistant Examiner* — Moo Ryong Jeong

(57) ABSTRACT

Provided is a distributed scheduling method and apparatus for resource allocation for Device-to-Device (D2D) communication. The method includes sending, by a Mobile Station (MS) including data to transmit, a first resource reservation message through at least one first slot among a plurality of slots constituting a resource reservation unit in a resource reservation channel; and when a second resource reservation message sent by another MS is not sensed in a slot with a higher priority than the first slot in the resource reservation unit, transmitting the data through a transmission resource unit corresponding to the resource reservation unit in a data transmission channel. The resource reservation channel corresponds to the transmission resource unit, and the plurality of slots has mutually cyclic priorities.

20 Claims, 13 Drawing Sheets

|  | Winner |  | Loser |
|---|---|---|---|
| Code/Slot | 3 > | 1 > | 2 |
| Code/Slot | 1 > | 2 > | 3 |
| Code/Slot | 2 > | 3 > | 1 |

FIG.6A

|  | Slot 1 | Slot 2 | Slot 3 | TX DECISION |
|---|---|---|---|---|
| 602 ~ Code 1 |  | NA | NT |  |
| 604 ~ Code 2 | NT |  | NA |  |
| 606 ~ Code 3 | DC | NT |  |  |

FIG.6B

| Winner | | | Loser | | |
|---|---|---|---|---|---|
| 5 | 6 > | 1 > | 2 | 3 | 4 |
| 6 | 1 > | 2 > | 3 | 4 | 5 |
| 1 | 2 > | 3 > | 4 | 5 | 6 |
| 2 | 3 > | 4 > | 5 | 6 | 1 |
| 3 | 4 > | 5 > | 6 | 1 | 2 |
| 4 | 5 > | 6 > | 1 | 2 | 3 |

Slot

| 1 | 2 | 3 | 4 | 5 | 5 |
|---|---|---|---|---|---|
|   | NA | NA | NA | NT | NT |
| NT |   | NA | NA | NA | NT |
| NT | NT |   | NA | NA | NA |
| DC | NT | NT |   | NA | NA |
| DC | DC | NT | NT |   | NA |
| DC | DC | DC | NT | NT |   |

FIG.7C

DISTRIBUTED SCHEDULING METHOD AND APPARATUS FOR RESOURCE ALLOCATION FOR DEVICE TO-DEVICE COMMUNICATION

CROSS-REFERENCE TO RELATED APPLICATION AND CLAIM OF PRIORITY

The present application is related to and claims the benefit under 35 U.S.C. §119(a) of a Korean patent application filed in the Korean Intellectual Property Office on May 9, 2014 and assigned Serial No. 10-2014-0055368, the entire disclosure of which is incorporated herein by reference.

TECHNICAL FIELD

The present disclosure relates to a method and apparatus for scheduling resource allocation for Device-to-Device (D2D) communication in a wireless network.

BACKGROUND

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, data traffic has increased drastically due to the dissemination of smartphones. In the future, the number of smartphone users will further increase, and application services using the smartphones, such as Social Networking Service (SNS), games and the like are expected to be more popularized, so the data traffic is expected to increase much more than now. In particular, if even intelligent Machine-to-Machine (M2M) communication utilizing things, such as communication between people and things, communication between things, and the like, which is expected to provide a new mobile market, is popularized in addition to the communication between people, the traffic transmitted to a Base Station (BS) or an evolved Node B (eNB) is expected to increase dramatically, so it may be difficult to deal with the traffic.

As technology capable of solving these problems, D2D communication that is used in both a licensed band and an unlicensed band such as Wireless Local Area Network (WLAN) has attracted great attention. D2D communication, when combined with mobile communication, increases the traffic capacity of the BS and reduces the overload of the BS. In other words, if Mobile Stations (MSs) or User Equipments (UEs) located in the same cell or adjacent cells establish (or set up) a D2D link between them, and then directly exchange data through the D2D link without passing through the BS, two links including an MS-BS link and a BS-MS link are reduced to one MS-MS link.

D2D communication in the unlicensed band recognizes the needs for communication between people, communication between people and things, and communication between things, to prevent the unnecessary waste of wireless resources and to determine and service the locally generated traffic. Therefore, there is a need for technology for efficiently operating the procedure in which multiple devices broadcast information about service or content to their surroundings, and receive a response thereto. D2D communication in the unlicensed band, unlike the existing Ad-hoc/sensor network such as Wireless Fidelity (WiFi), ZIGBEE and the like, requires D2D operations such as transmission/reception of a search signal, paring for establishing a D2D link and scheduling for D2D resources, after first matching synchronization between devices. Since the synchronization between MSs that will perform D2D communication is matched, a control signal between distributed devices is efficiently transmitted and received, so distributed scheduling is applied.

In distributed scheduling, since there is no master that recognizes channel information of the entire network and performs resource allocation, resource allocation is determined depending on the region-specific partial information, causing a decrease in the performance and an increase in the overhead. Therefore, there is a need for an efficient distributed resource allocation scheme for solving these problems and technology for solving the resource allocation conflicts.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, an aspect of the present disclosure is to address at least the above-mentioned problems and/or disadvantages and to provide at least the advantages described below. Accordingly, an aspect of an embodiment of the present disclosure is to provide a method and apparatus for transmitting and receiving a signal in a communication system.

Various embodiments of the present disclosure provide an apparatus and method for performing efficient data transmission in a system based on a distributed allocation scheme.

Various embodiments of the present disclosure provide a method and apparatus for supporting efficient distributed resource allocation for D2D communication.

Various embodiments of the present disclosure provide an apparatus and method for dividing a resource reservation channel for D2D communication into a plurality of time slots having mutually cyclic priorities.

Various embodiments of the present disclosure provide an apparatus and method for determining a priority for a transmission resource depending on the time slot that is used for resource reservation in a resource reservation channel for D2D communication.

Various embodiments of the present disclosure provide a distributed scheduling method for resource allocation for Device-to-Device (D2D) communication. The method includes sending, by a Mobile Station (MS) having data to transmit, a resource reservation message through at least one first slot among a plurality of slots constituting a resource reservation unit in a resource reservation channel; and when a resource reservation message sent by another MS is not sensed in a slot having a higher priority than the first slot in the resource reservation unit, transmitting the data through a transmission resource unit corresponding to the resource reservation unit in a data transmission channel. The resource reservation channel corresponds to one transmission resource unit, and the plurality of slots has mutually cyclic priorities.

Various embodiments of the present disclosure provide a Mobile Station (MS) for performing Device-to-Device (D2D) communication. The MS includes a message generator configured to generate a resource reservation message; a data generator configured to generate data to be transmitted; a transmitter configured to, when there is data to be transmitted, send a resource reservation message through at least one first slot selected from among a plurality of slots constituting a resource reservation unit in a resource reservation channel, the plurality of slots having mutually cyclic priorities; a receiver configured to listen to remaining slots except for the first slot in the resource reservation unit to determine whether there is a resource reservation message that is sent by another MS; and a controller configured to, when there is no resource reservation message that is sent by another MS in a slot having a higher priority than the first slot in the resource reservation unit, control the transmitter to transmit the data through a transmission resource unit corresponding to the resource reservation unit in a data transmission channel.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A and 6B illustrate a relationship between mutually cyclic priorities of a resource reservation unit according to various embodiments of the present disclosure;

FIGS. 7A to 7C illustrate a configuration of a resource reservation unit according to various embodiments of the present disclosure;

Throughout the drawings, like reference numerals will be understood to refer to like parts, components, and structures.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
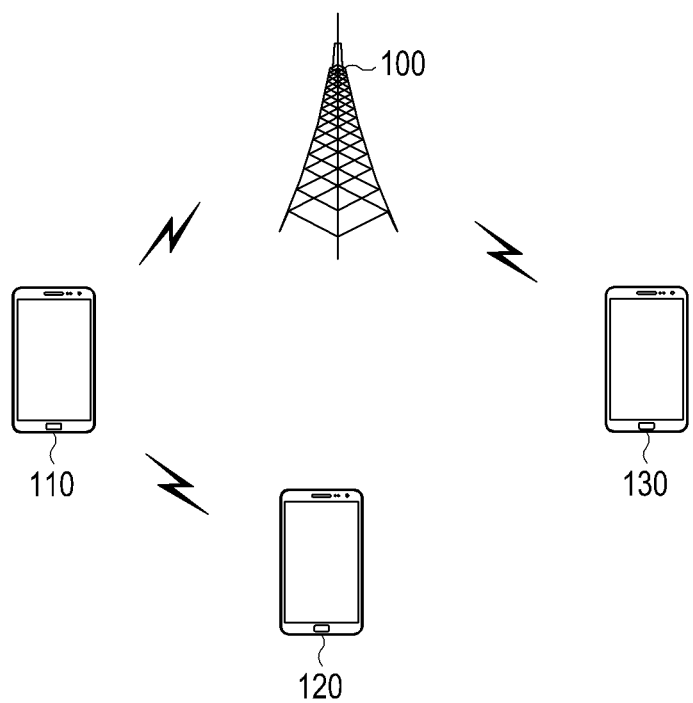
FIG. 1 illustrates a structure of a communication system supporting D2D communication, according to various embodiments of the present disclosure.

FIG. 1 illustrates a structure of a communication system supporting D2D communication, according to various embodiments of the present disclosure is applicable.

Referring to FIG. 1, a plurality of MSs 110, 120 and 130 exist in a network, and the MSs 110, 120 and 130 perform communication with each other through a BS 100 or perform communication directly with each other. As an example, the MSs 110 and 130 establish their links to the BS 100 and communicate with each other through the BS 100, and the resources used for the communication is allocated to the MSs 110 and 130 by the BS 100. As another example, the MSs 110 and 120 directly communicate with each other through a D2D link without passing through the BS 100. As for the resources used for the communication, the MSs 110 and 120 reserve (or schedule) the resources on their own, and then use the reserved resources.

When communication between MSs is performed directly, each MS should determine on its own which MS will use each transmission resource. In this specification, the scheme in which resource allocation is made by the decision between multiple MSs, not by a fixed BS, will be defined as a distributed resource allocation scheme.

In communication based on the distributed resource allocation scheme, such as D2D communication, two major problems occur. With respect to the first problem, in order for each MS to determine whether to allocate a particular resource, the MS sequentially performs an operation of determining whether a particular resource is available and an operation of using the resource (such as performing communication) when it is determined that the particular resource is available. Due to these operations, a delay and an unavailable resource (or a blank resource area to be described below) occur. With respect to the second problem, in the distributed resource allocation scheme, multiple MSs request resource allocation at the same time due to the characteristics of the distributed resource allocation scheme. In certain embodiments, when an MS is selected by an absolute priority relationship between MSs, nearby MSs sequentially fall behind in superiority due to the MS having the highest priority, so even the MSs in the second and third tiers abandon data transmission, causing the cascade yielding problem.

The first problem will be described as follows.

When D2D communication uses the distributed resource allocation scheme, each MS adopts a transmission scheme after pre-signal sensing. The pre-sensing means an operation in which an MS determines whether there is signal transmission by other MSs, with respect to the transmission resource that the MS desires to use. Each MS transmits its own signal, when the MS determines there is no signal transmission by other MSs.

Figure 2A:
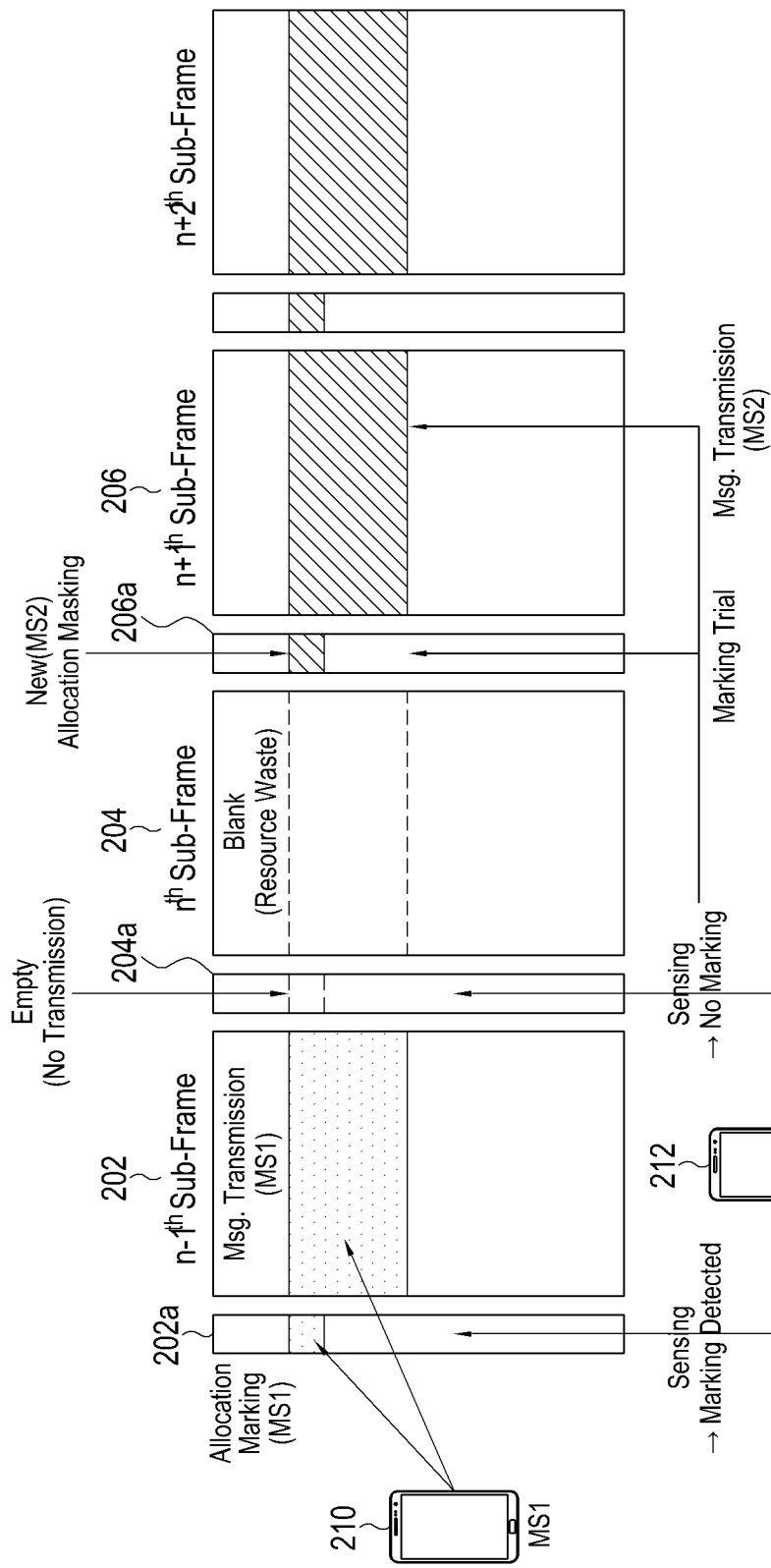
FIG. 2A illustrates an example of a resource allocation operation that be used in D2D communication according to various embodiments of the present disclosure.

FIG. 2A illustrates an example of a transmission operation after pre-sensing in D2D communication according to various embodiments of the present disclosure.

Referring to FIG. 2A, two MSs 210 and 212 desiring to perform D2D communication exist in a network, and in order to determine whether the MSs 210 and 212 use each of sub-frames 202, 204 and 206 for D2D communication, the MSs 210 and 212 perform signal sensing for resource reservation channels 202a, 204a and 206a on which availability of their associated sub-frames is marked or perform signal sensing for data transmission resources themselves in the sub-frames. The resource reservation channels 202a, 204a and 206a are located just before their associated sub-frames 202, 204 and 206.

Specifically, the first MS (MS1) 210 transmits a resource reservation signal (such as a perform allocation marking) in the resource reservation channel 202a and sends a message including the data that the first MS 210 desires to transmit, in the subsequent (n-1)-th sub-frame 202. Upon sensing the allocation-marked signal of the first MS 210 in the resource reservation channel 202a, the second MS (MS2) 212 having data to transmit determines that the second MS 212 cannot use the (n-1)-th sub-frame 202. The second MS 212 determines whether there is a resource reservation signal of another MS in the resource reservation channel 204a. When it is determined there is no resource reservation signal of another MS in the resource reservation channel 204a, the second MS 212 transmits a resource reservation signal in a subsequent particular time (such as the next resource reservation channel 206a) and sends a message including the data in the subsequent sub-frame 206.

Since the MS's sensing operation for resource channels or resource reservation channels is an MS's signal reception operation and the MS's marking operation for resource reservation channels is an MS's signal transmission operation, the MS cannot typically perform the above two operations at the same time. Even when the MS performs the two operations at the same time, the high signal strength of the transmission signal acts as interference in the MS, causing a decrease in the detection possibility of the received signal. In certain embodiments, the MS cannot perform sensing and marking at the same time. Accordingly, even though the MS determines there is no transmission data for a particular resource, through the sensing operation, the MS may not perform the operation of using the resource, so a blank area (such as n-th sub-frame in FIG. 2A) that cannot be used in a transmission resource occurs, causing a decrease in transmission efficiency of the communication system.

The second problem will be described as follows.

In the above-described distributed resource allocation scheme, when multiple MSs request allocation for the same transmission resource at the same time, one MS that will use the transmission resource should be selected from among the MSs. When requesting the allocation, each MS transmits a particular value or a particular sequence having an absolute priority. Based on the absolute priority, the MS having the highest priority is the MS that is selected finally.

Figure 2B:
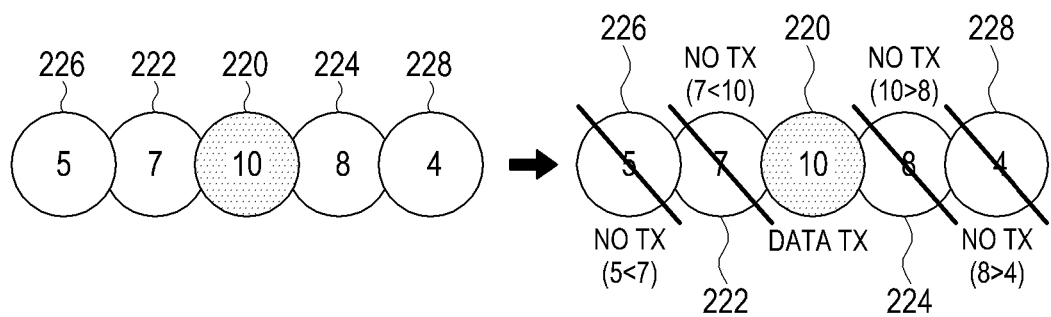
FIG. 2B illustrates an example of priority-specific resource allocation that is used in D2D communication according to various embodiments of the present disclosure.

FIG. 2B illustrates an example of priority-specific resource allocation that is used in D2D communication. Referring to FIG. 2B, multiple MSs 220, 222, 224, 226 and 228 desiring to perform D2D communication exist in a network, and the MSs 220, 222, 224, 226 and 228 have priorities of 10, 7, 8, 5 and 4, respectively. In certain embodiments, the higher value means the higher priority. The MS 220 has the highest priority of 10, and the MSs 222 and 224 having the priorities of 7 and 8 are located in the vicinity of the MS 220. In addition, the MSs 226 and 228 having the priorities of 5 and 4 are located in the vicinity of the MSs 222 and 224, respectively.

In certain embodiments, the MS 220 that is located in the center with the priority of 10 has the rights for communication at all times. Not only the MSs 222 and 224 that are located in the vicinity of the MS 220 with the priorities of 7 and 8, but also the MSs 226 and 228 that are located in the vicinity of the MSs 222 and 224 with the priorities of 5 and 4, may not perform D2D transmission causing the cascade yielding problem.

In various embodiments of the present disclosure, a system based on the distributed allocation scheme, such as a D2D communication system, divides a resource reservation channel for reservation for a particular transmission resource into a plurality of time slots, and determines a priority for the transmission resource depending on the time slot that an MS selects for reservation. The time slots of the resource reservation channel include mutually cyclic priorities, and a particular time slot may not have the absolute priority.

In the system based on the distributed allocation scheme, such as the D2D system, the total resources include two types of logical channels: a data transmission channel that is an area for data transmission, and a resource reservation channel that precedes the data transmission channel. The resource reservation channel is a channel in which each MS transmits a resource reservation signal for securing of the transmission resource or in which the MS checks a resource reservation signal of another MS. The resource reservation channel is related to the transmission resource of at least one data transmission channel that is used for data transmission in response to the resource reservation channel.

Figure 3:
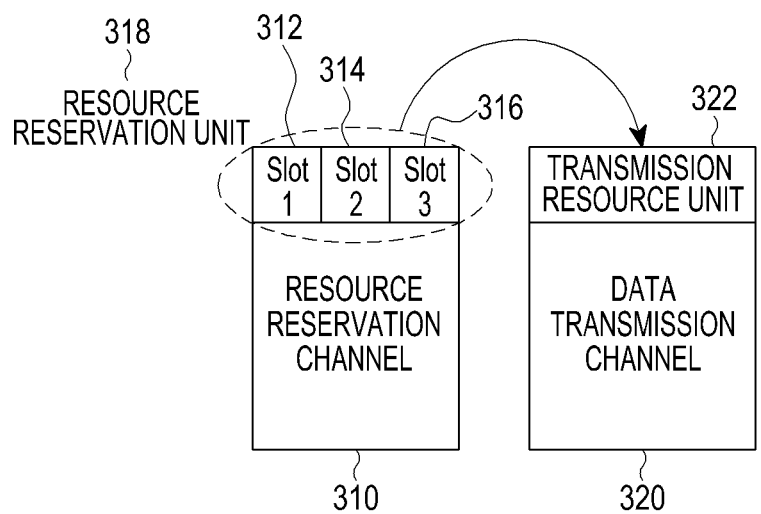
FIG. 3 illustrates structures of a resource reservation channel and a data transmission channel according to various embodiments of the present disclosure.

FIG. 3 illustrates structures of a resource reservation channel and a data transmission channel according to various embodiments of the present disclosure.

Referring to FIG. 3, in a data transmission channel 320, the minimum basic unit of resource allocation is defined as a resource unit 322, and the resource unit 322 is the same as a Resource Block (RB) defined in the 3rd Generation Partnership (3GPP) standard or is an RB group that includes multiple RBs. The basic unit of a resource reservation channel 310, which is defined for reserved allocation for one resource unit 322, is defined as a resource reservation unit 318.

The resource reservation channel 310 includes a plurality of resource reservation units 318, and similarly, the data transmission channel 320 includes a plurality of resource units 322. Each resource reservation unit 318 is configured to be mapped to a particular resource unit 322.

Each resource reservation unit 318 in the resource reservation channel 310 includes one or more symbols or slots 312, 314 and 316 on the time axis. An MS transmits a resource reservation signal including a resource reservation message through a symbol or slot on a particular time according to a predetermined rule, and attempt to receive a resource reservation signal of another MS during the remaining slots in the same resource reservation unit 318.

An MS performs transmission or reception in each symbol or slot of the resource reservation unit. The symbols or slots in each resource reservation unit are separated without being continuous with each other in terms of time.

Figure 4:
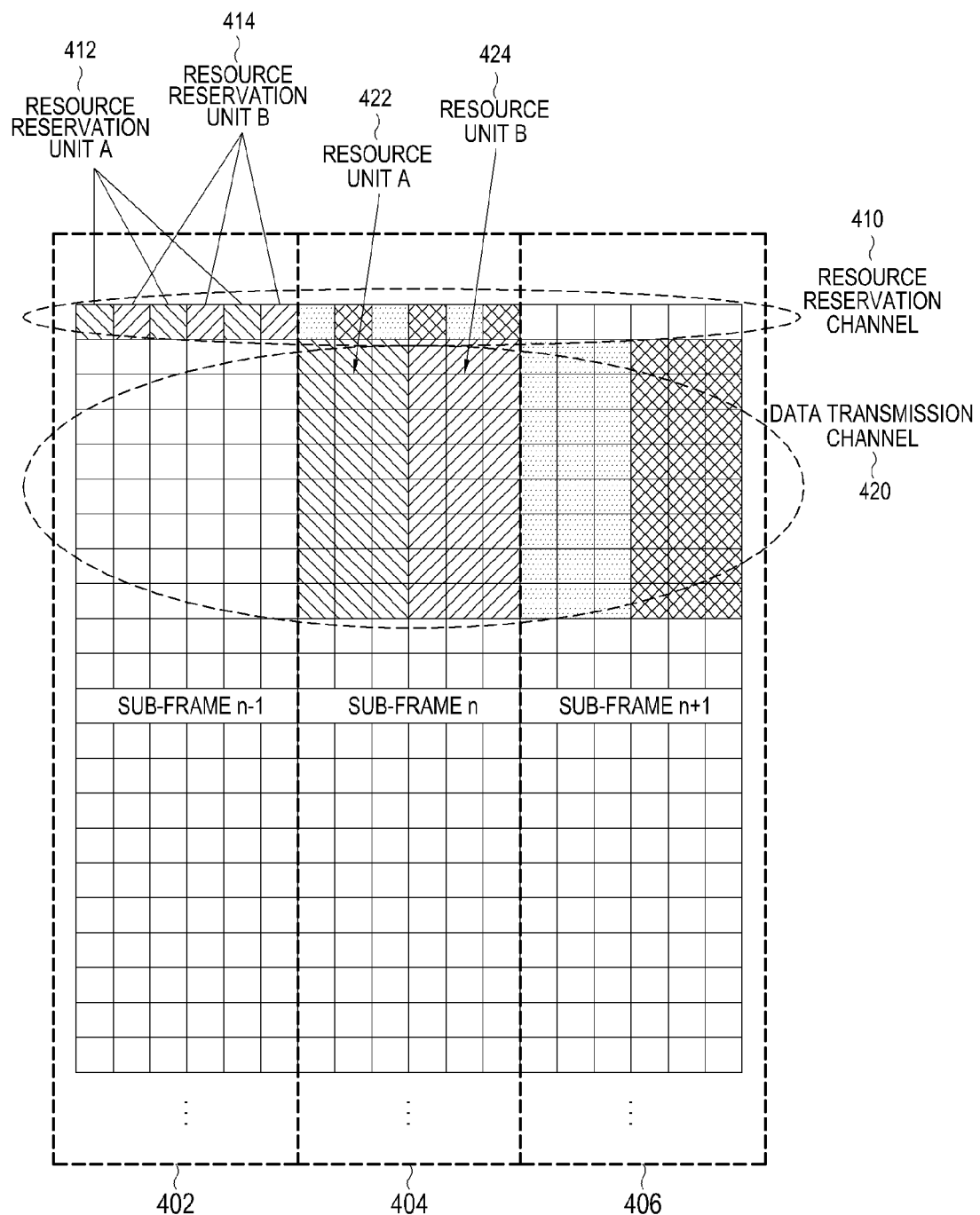
FIG. 4 illustrates a configuration of a resource reservation channel according to various embodiments of the present disclosure.

FIG. 4 illustrates a configuration of a resource reservation channel according to various embodiments of the present disclosure.

Referring to FIG. 4, (n−1)-th, n-th, (n+1)-th sub-frames 402, 404 and 406 on the time axis are illustrated, and the sub-frames 402, 404 and 406 are logically separated into a resource reservation channel 410 and a data transmission channel 420. A resource reservation channel in the (n−1)-th sub-frame 402 includes a resource reservation unit A 412 and a resource reservation unit B 414, and the resource reservation units 412 and 414 are used for transmission reservation for a transmission resource unit A 422 and a transmission resource unit B 424 in the n-th sub-frame 414, respectively.

One resource reservation unit 412 (or 414) includes multiple symbols or slots which are continuous or discontinuous, and the resource reservation units 412 and 414 for multiple transmission resource units 422 and 424 of one sub-frame 404 exist by being mixed with each other in terms of time. In the illustrated example, the resource reservation unit A 412 includes first, third and fifth symbols of the (n−1)-th sub-frame 402, and the resource reservation unit B 414 includes second, fourth and sixth symbols of the (n−1)-th sub-frame 402.

When sending a resource reservation message for one transmission resource unit, an MS performs a reception operation for other symbols or slots, while sending the resource reservation message through particular symbols or slots. As in the resource reservation unit A 412 and the resource reservation unit B 414, transmission symbols and reception symbols are alternately arranged so as to minimize the processing time delay and propagation delay between transmission and reception processes.

The location of the symbol or slot that an MS selects from a particular resource reservation unit corresponds to the priority for reservation of the transmission resource unit. Therefore, MSs having the rights to use the transmission resource are determined depending on the location of the symbol or slot selected by the MSs.

Figure 5:
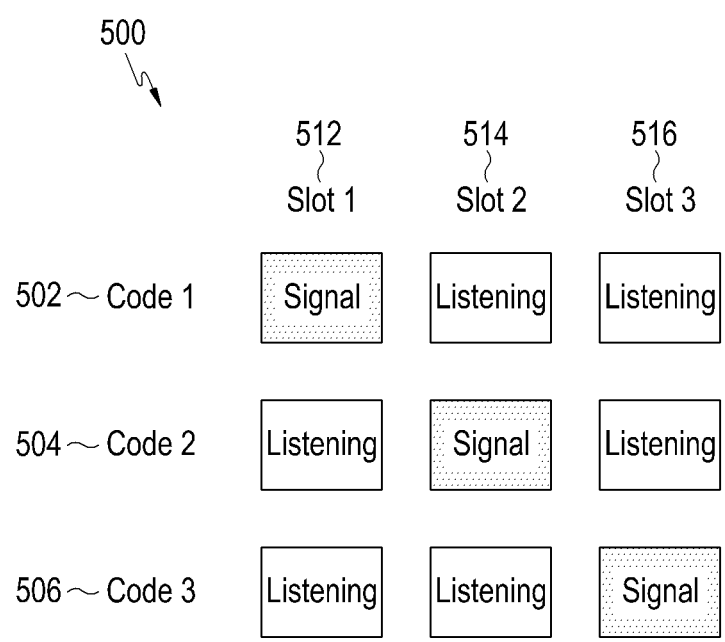
FIG. 5 illustrates a configuration of a resource reservation unit according to various embodiments of the present disclosure.

FIG. 5 illustrates a configuration of a resource reservation unit according to various embodiments of the present disclosure.

Referring to FIG. 5, a resource reservation unit 500 includes three slots 512, 514 and 516, and an MS sends a resource reservation message in any one of the three slots 512, 514 and 516. The resource reservation message is configured with one tone code within one slot, or with a reservation signal code including or one or more tones. When an MS determines to transmit a code 502 in the first slot 512, the MS performs a listening operation of sensing whether there is a code that is transmitted by other MSs in the second and third slots 514 and 516. Similarly, when an MS determines to transmit a code 504 in the second slot 514, the MS performs a listening operation in the first and third slots 512 and 516, and when an MS determines to transmit a code 506 in the third slot 516, the MS performs a listening operation in the first and second slots 512 and 514.

Slots constituting one resource reservation unit include a relationship of mutually cyclic priorities with no slot having an absolute priority. When an MS senses a code that is transmitted by another MS in a slot having a higher priority than the slot selected by the MS itself, the MS determines that the MS cannot use a transmission resource unit corresponding to the resource reservation unit. When an MS fails to sense a code that is transmitted by another MS in a slot having a higher priority than the slot selected by the MS itself, the MS transmits data through the transmission resource unit, determining that the MS uses the transmission resource unit corresponding to the resource reservation unit.

FIGS. 6A and 6B illustrate a relationship between mutually cyclic priorities of a resource reservation unit according to various embodiments of the present disclosure. Shown herein is a relative priority relationship between the slots or codes by which each MS transmits a resource reservation signal.

Referring to FIG. 6A, a code/slot index 1 is superior to a code/slot index 2, but has a lower priority than a code/slot index 3. The code/slot index 2 is superior to the code/slot index 3, but has a lower priority than the code/slot index 1. The code/slot index 3 is superior to the code/slot index 1, but has a lower priority than the code/slot index 2.

Referring to FIG. 6B, when an MS transmits a resource reservation signal in code 1 (or slot 1) 602, the MS monitors whether a resource reservation signal is transmitted by another MS, in slot 2 and slot 3. Since slot 2 has a lower priority than slot 1, slot 2 is automatically closed or treated as Not Available (NA). When transmission of a resource reservation signal exists in slot 3 having a higher priority than slot 1, the MS may not transmit data in the transmission resource unit corresponding to the resource reservation unit. When transmission of a resource reservation signal does not exist in slot 3 with a higher priority than slot 1 (i.e., in the case of No Transmission (NT)), the MS determines to transmit data in the transmission resource unit corresponding to the resource reservation unit. The MS acquires the transmission rights for the transmission resource unit corresponding to the resource reservation unit.

When an MS determines to transmit a resource reservation signal in code 2 (or slot 2) and transmission of a resource reservation signal by another MS exists in slot 1, the MS abandons the transmission of the resource reservation signal in slot 2, which is NA. When the resource reservation signal by another MS is not transmitted in slot 1, the MS transmits a resource reservation signal in slot 2. Slot 3 with a lower priority than slot 2 is NA, and the MS acquires the transmission rights for the transmission resource unit corresponding to the resource reservation unit.

When the MS determines to transmit a resource reservation signal in code 3 (or slot 3), the MS may not need to listen to slot 1 with a lower priority than slot 3. The slot 1 is Don't Care (DC). When transmission of a resource reservation signal by another MS exists in slot 2, the MS abandons the transmission of the resource reservation signal in slot 3. When transmission of a resource reservation signal does not exist in slot 2 (i.e., in the case of NT), the MS transmits the resource reservation signal in slot 3 and acquires the transmission rights for the transmission resource unit corresponding to the resource reservation unit.

Figure 7A:
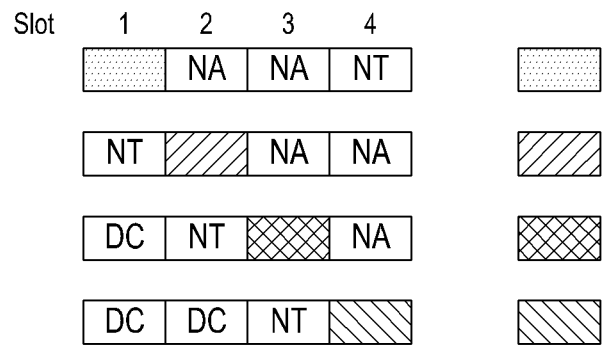
Figure 7B:
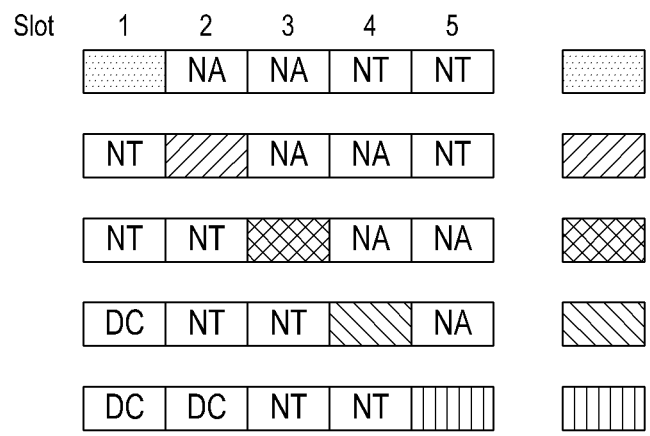

FIGS. 7A to 7C illustrate a configuration of a resource reservation unit according to various embodiments of the present disclosure.

Referring to FIGS. 7A to 7C, one resource reservation unit is divided into four, five or six slots, and similarly, the multiple slots include a relationship of mutually cyclic priorities. A slot with a lower index has a higher priority, and a slot with the lowest index has a lower priority than the slot with the highest index. In certain embodiments, a slot with a higher index has a higher priority, and a slot with the highest index has a lower priority than the slot with the lowest index.

Referring to FIG. 7A, when a signal exists in slot 1, slots 2 and 3 are NA, and when slot 4 is NT, the MS that transmitted a signal in slot 1 has the transmission rights for the data. When slot 1 is NT, a signal is transmitted in slot 2, and since slots 3 and 4 are NA, the MS that transmitted a signal in slot 2 has the transmission rights. When a signal is transmitted in slot 3, slot 1 is DC and slot 4 is NA, and when slot 2 is NT, the MS that transmitted a signal in slot 3 has the transmission rights. When a signal is transmitted in slot 4, slots 1 and 2 are DC, and when slot 3 is NT, the MS that transmitted a signal in slot 4 has the transmission rights.

Referring to FIG. 7B, when a signal exists in slot 1, slots 2 and 3 are NA, and when slots 4 and 5 are NT, the MS that transmitted a signal in the slot 1 has the transmission rights for the data. When slot 1 is NT, a signal is transmitted in slot 2, and slots 3 and 4 are NA. When slot 5 is NT, the MS that transmitted a signal in slot 2 has the transmission rights. When slots 1 and 2 are NT, a signal is transmitted in slot 3, and when slots 4 and 5 are NA, the MS that transmitted a signal in slot 3 has the transmission rights. When a signal is transmitted in slot 4, slot 1 is DC and slot 5 is NA, and when slots 2 and 3 are NT, the MS that transmitted a signal in slot 4 has the transmission rights. When a signal is transmitted in slot 5, slots 1 and 2 are DC, and when slots 3 and 4 are NT, the MS that transmitted a signal in slot 5 has the transmission rights.

Referring to FIG. 7C, when a signal exists in slot 1, slots 2, 3 and 4 are NA, and when slots 5 and 6 are NT, the MS that transmitted a signal in slot 1 has the transmission rights for the data. When slot 1 is NT, a signal is transmitted in slot 2, and slots 3, 4 and 5 are NA. When slot 6 is NT, the MS that transmitted a signal in slot 2 has the transmission rights. When slots 1 and 2 are NT, a signal is transmitted in slot 3, and when slots 4, 5 and 6 are NA, the MS that transmitted a signal in slot 3 has the transmission rights. When a signal is transmitted in slot 4, slot 1 is DC and slots 5 and 6 are NA, and when slots 2 and 3 are NT, the MS that transmitted a signal in slot 4 has the transmission rights. When a signal is transmitted in slot 5, slots 1 and 2 are DC and slot 6 is NA, and when slots 3 and 4 are NT, the MS that transmitted a signal in slot 5 has the transmission rights. When a signal is transmitted in slot 6, slots 1, 2 and 3 are DC, and when slots 4 and 5 are NT, the MS that transmitted a signal in slot 6 has the transmission rights.

As described above, the slots in the resource reservation unit have mutually cyclic priorities, and the resource reservation channel is configured such that a slot in a particular location may not have an absolute priority, thereby making it possible to ensure the fairness between MSs that attempt resource reservation through the resource reservation channel, and to prevent the transmission by multiple nearby MSs from being blocked by the MS having the absolute priority.

Apart from the above-described priority relationship between slots, particular communication (such as communication for emergency, disaster and the like) should continuously use the same resource unit or needs the absolute priority, unlike the general D2D communication.

The MS desiring to perform the particular communication transmits a resource reservation signal through all the slots in the resource reservation unit. In certain embodiments, the resource reservation signal by all the other MSs is neutralized.

Figure 8:
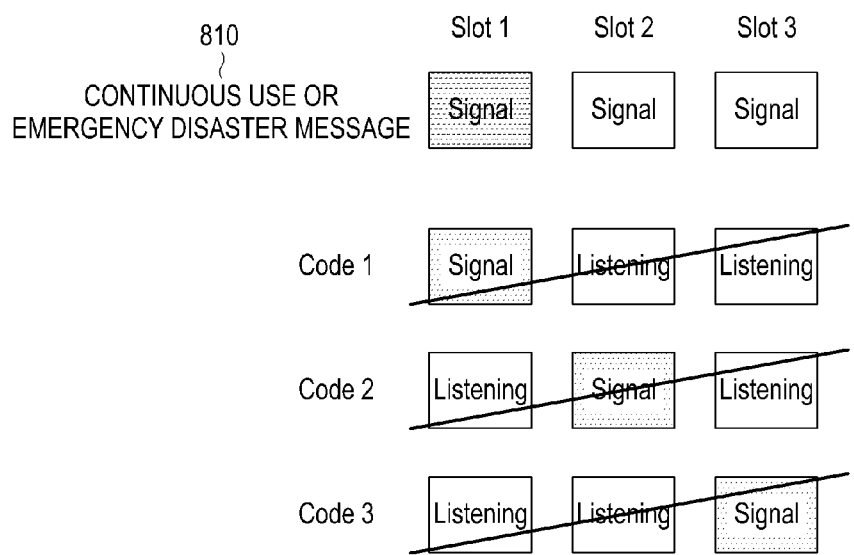
FIG. 8 illustrates a resource allocation structure for absolute resource reservation according to various embodiments of the present disclosure.

FIG. 8 illustrates a resource allocation structure for absolute resource reservation according to various embodiments of the present disclosure.

Referring to FIG. 8, when an MS desires to continuously use a particular transmission resource unit or when an MS desires to send an emergency message 810 for calamity, disaster, and the like, using the transmission resource unit, the MS sends a resource reservation message using all to the slots in the resource reservation unit corresponding to the transmission resource unit. As an example, an MS that uses the entirety of the resource reservation unit may require a particular permission by a service provider.

Typically, when MSs including different codes transmit a resource reservation signal using all the slots even though the MSs don't continuously use a particular transmission resource unit or don't send an emergency message, each MS cannot determine its own priority, so all the MSs may not transmit the data. In the above-described embodiments of the present disclosure, when a relatively superior slot that precedes in terms of time is already occupied, no transmission may occur in the subsequent slots with lower priorities, thereby solving the problem that the priorities may not be determined due to the occupation of all the slots.

When multiple MSs select the same slot at the same time, priorities of the MSs that transmitted a resource reservation signal through the slot may not be distinguished, so the conflict occurs. In order to solve this problem, the number of slots in one resource reservation unit is increased, or one or more resource reservation units are allocated for one transmission resource unit.

Figure 9:
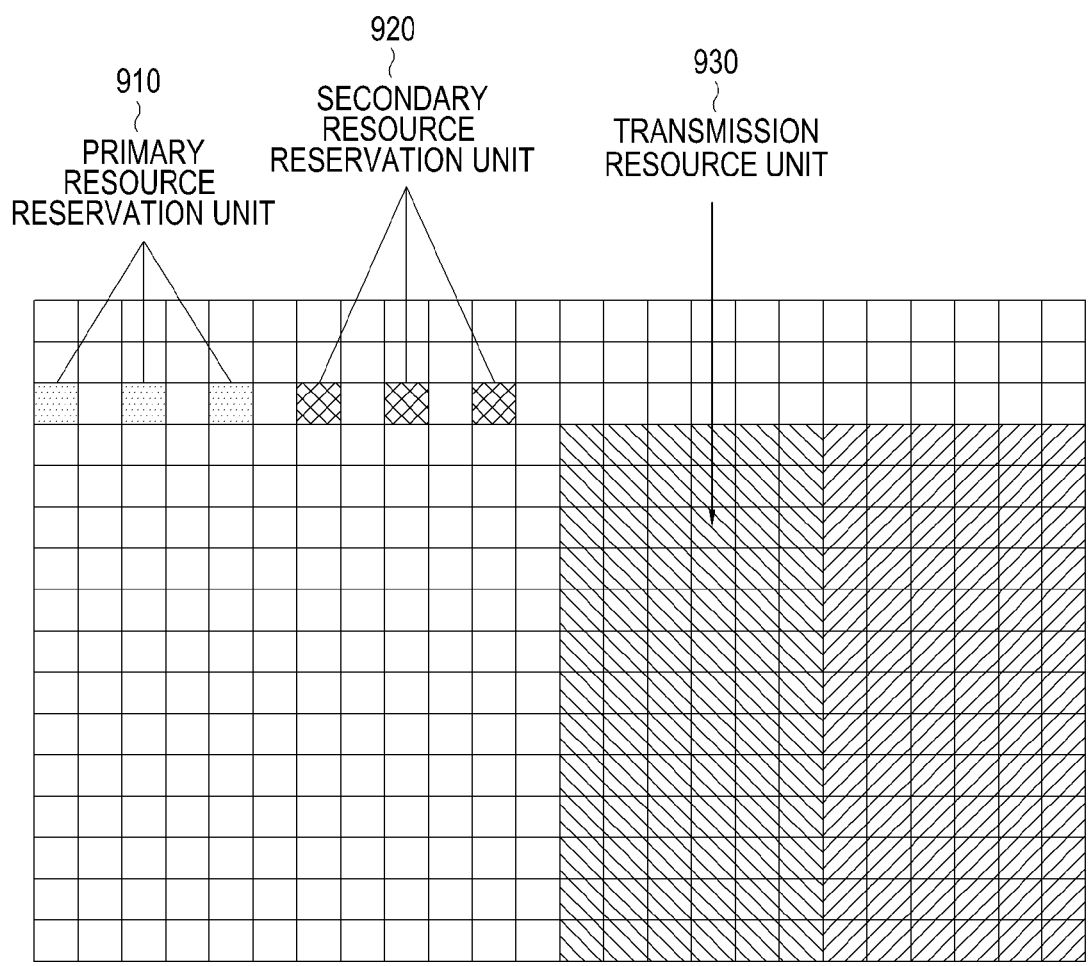
FIG. 9 illustrates a structure of a resource reservation channel for minimizing the conflict according to various embodiments of the present disclosure.

FIG. 9 illustrates a structure of a resource reservation channel for minimizing the conflict according to various embodiments of the present disclosure.

Referring to FIG. 9, for one transmission resource unit 930, a primary resource reservation unit 910 is mapped and a secondary resource reservation unit 920 is mapped. Each MS acquires the transmission rights for the transmission resource unit 930 using the primary resource reservation unit 910 and attempts resource reservation for the transmission resource unit 930 using the secondary resource reservation unit 920. When the MS succeeds in both the resource reservation for the transmission resource unit 930 using the primary and the secondary resource reservation units 910 and 920, the MS transmits data through the transmission resource unit 930. When two or more MSs acquire the transmission rights for the transmission resource unit 930 through the primary resource reservation unit 910, the MSs competes with each other again for the transmission resource unit 930 through the secondary resource reservation unit 920. As a result, it is possible to reduce the conflict probability for the rights to use the transmission resource unit 930.

Figure 10:
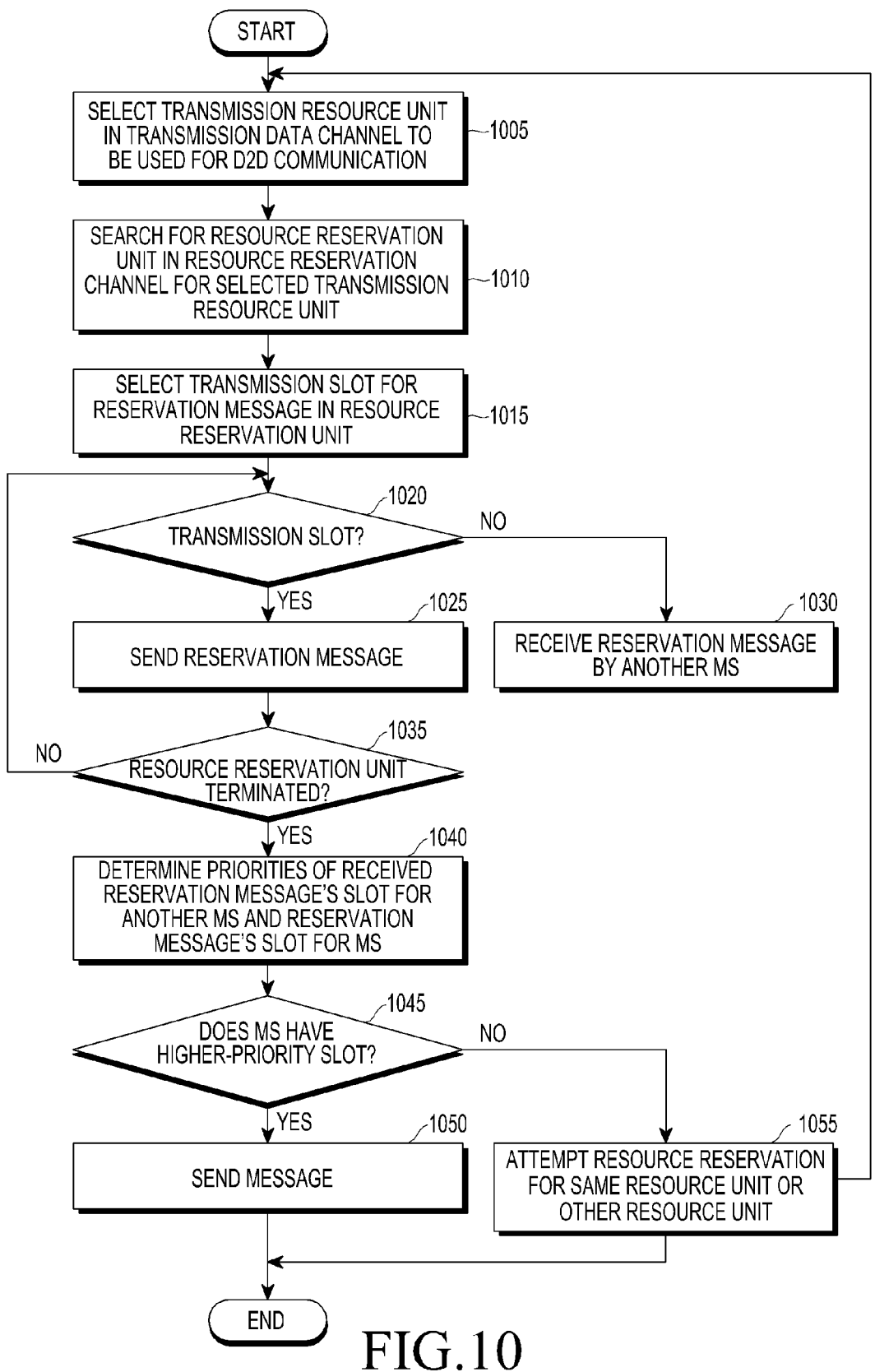
FIG. 10 illustrates a resource reservation procedure according to various embodiments of the present disclosure.

FIG. 10 illustrates a resource reservation procedure according to various embodiments of the present disclosure.

Referring to FIG. 10, in operation 1005, an MS determines at least one transmission resource unit that the MS will use for data transmission. Various algorithms are used to determine a transmission resource unit. As an example, the MS determines a resource occupancy or an interference estimate for each transmission resource unit by measuring the signal strength for each available transmission resource unit for a predetermined time, and selects at least one transmission resource unit having a lower occupancy depending on the determination.

In operation 1010, the MS finds a resource reservation unit for the transmission resource unit. In operation 1015, the MS determines a slot or symbol to be used for resource reservation, within the resource reservation unit. Various algorithms are used to determine the slot or symbol. As an example, the MS generates a random number by using, as a seed value, an Identifier (ID) of the MS and a timing/clock inside the MS and selects one or more slots or symbols in the resource reservation unit based on the generated random number.

In operation 1020, the MS determines whether the time has reached the slot that is selected within the resource reservation unit in operation 1015. When the time has reached the selected slot, the MS sends a resource reservation message through the selected slot in operation 1025. When the time has not reached the selected slot, the MS monitors, in operation 1030, whether a resource reservation message was sent by another MS in at least one slot before the time has reached the selected slot.

In operation 1035, the MS determines whether the MS has processed (such as transmitted or listened to) all the slots of the resource reservation unit. When t unprocessed slots remain in the resource reservation unit, the MS returns to operation 1020. On the other hand, when all the slots have been processed and the resource reservation unit is terminated, the MS proceeds to operation 1040.

In operation 1040, the MS compares a priority of the slot in which the resource reservation message by another MS was sensed with a priority of the slot in which the MS has sent the resource reservation message. In operation 1045, the MS determines whether the slot in which the MS sent a resource reservation message has a higher priority.

Although not illustrated, in operation 1030, the MS may not perform listening for at last one previous slot (such as a DC slot) with a lower priority than the selected slot. Further, in operation 1025, when the MS senses a resource reservation message from another MS in at least one previous slot with a higher priority than the selected slot, the MS abandons the transmission for the selected slot. In certain embodiments, the MS returns to operation 1005 after abandoning the transmission for the transmission resource unit, or proceeds to operation 1020 to attempt resource reservation through selected another slot.

When it is determined in operation 1045 that the slot that the MS sent a resource reservation message has a higher priority than the slot in which a resource reservation message by another MS was sensed or no resource reservation message is sensed in another slot, then the MS transmits a signal including data through the transmission resource unit in operation 1050. In certain embodiments, when a resource reservation message from another MS is sensed in a slot with a higher priority than the slot selected by the MS, the MS abandons the data transmission for the transmission resource unit and determines to attempt resource reservation for the same transmission resource unit or other transmission resource unit, in operation 1055.

Figure 11:
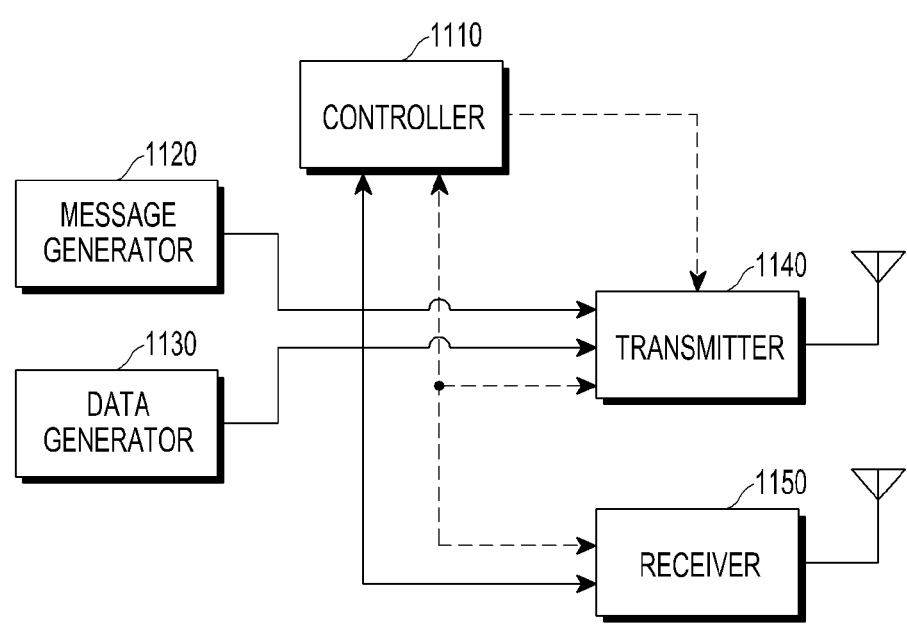
FIG. 11 illustrates a structure of an MS according to various embodiments of the present disclosure.

FIG. 11 illustrates a structure of an MS according to various embodiments of the present disclosure.

Referring to FIG. 11, a controller 1110 determines a transmission slot of a resource reservation message generated by a message generator 1120 and controls a transmitter 1140 with respect to the timing or time position of the transmission slot. For other slots except for the transmission slot, the controller 1110 controls a receiver 1150 to receive resource reservation messages of other MSs. The transmitter 1140, under control of the controller 1110, sends a resource reservation message in a permitted slot. The receiver 1150, under control of the controller 1110, listens to at least one permitted slot and provides, to the controller 1110, the information indicating whether a resource reservation message sent by another MS has been sensed.

Based on the information about the selected transmission slot and the transmission and reception results of the resource reservation message, the controller 1110 controls the transmitter 1140 to send a data message generated by a data generator 1130 through the transmission resource unit. When no other resource reservation message is sensed in a slot with a higher priority than the slot in which the MS sent a resource reservation message, the controller 1110 delivers information about the transmission resource unit to the transmitter 1140. The transmitter 1140 receives a message including data from the data generator 1130 and sends the message including data through the transmission resource unit under control of the controller 1110.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A distributed scheduling method for resource allocation for Device-to-Device (D2D) communication, the method comprising:
    sending, by a Mobile Station (MS) with data to transmit, a first resource reservation message through at least one first slot among a plurality of slots constituting a resource reservation unit in a resource reservation channel; and
    when a second resource reservation message sent by another MS is not sensed in a slot with a higher priority than the first slot in the resource reservation unit, transmitting the data through a transmission resource unit corresponding to the resource reservation unit in a data transmission channel;
    wherein the resource reservation channel corresponds to the transmission resource unit, and the plurality of slots comprise mutually cyclic priorities.

2. The distributed scheduling method of claim 1, wherein among the plurality of slots, a slot with a lower index has a higher priority and a slot with a lowest index has a lower priority than a slot with a highest index.

3. The distributed scheduling method of claim 1, further comprising omitting listening to at least one slot with a lower priority than the first slot, among at least one slot that precedes the first slot in terms of time.

4. The distributed scheduling method of claim 1, further comprising abandoning sending of the first resource reservation message through the first slot, when the second resource reservation message is sent by another MS in at least one slot that precedes the first slot in terms of time.

5. The distributed scheduling method of claim 1, further comprising:
    sending the first resource reservation message through all slots constituting the resource reservation unit when the MS desires continuous use of the transmission resource unit corresponding to the resource reservation unit and when the MS desires to send an emergency disaster message through the transmission resource unit.

6. The distributed scheduling method of claim 1, wherein transmitting the data comprises:
    when no second resource reservation message is sent by another MS in a slot with a higher priority than the first slot in the resource reservation unit, sending the first resource reservation message through a second slot selected from among a plurality of slots constituting an additional resource reservation unit that succeeds the resource reservation unit; and
    when no second resource reservation message is sent by another MS in a slot with a higher priority than the second slot in the additional resource reservation unit, transmitting the data through the transmission resource unit.

7. The distributed scheduling method of claim 1, further comprising selecting the resource reservation unit with a lower occupancy from among a plurality of resource reservation units by measuring signal strengths of the resource reservation units in the resource reservation channel.

8. The distributed scheduling method of claim 1, wherein the first slot is selected from the plurality of slots, using at least one of an identifier of the MS and a timing or clock inside the MS.

9. The distributed scheduling method of claim 1, further comprising increasing a number of slots in the resource reservation unit when multiple MSs select a same slot at a same time and priorities of the MSs cannot be distinguished.

10. The distributed scheduling method of claim 1, further comprising allocating one or more resource reservation units for the transmission resource unit when multiple MSs select a same slot at a same time and priorities of the MSs cannot be distinguished.

11. A Mobile Station (MS) for performing Device-to-Device (D2D) communication, the MS comprising:
    a message generator configured to generate a first resource reservation message;
    a transmitter configured to, when there is data to be transmitted, send the first resource reservation message through at least one first slot selected from among a plurality of slots constituting a resource reservation unit in a resource reservation channel, wherein the plurality of slots having mutually cyclic priorities;
    a receiver configured to listen to remaining slots, except for the first slot in the resource reservation unit, to determine whether a second resource reservation message is sent by another MS; and
    a controller configured to, when no second resource reservation message is sent by another MS in a slot with a higher priority than the first slot in the resource reservation unit, control the transmitter to transmit the data through a transmission resource unit corresponding to the resource reservation unit in a data transmission channel.

12. The MS of claim 11, wherein among the plurality of slots, a slot with a lower index has a higher priority and a slot with a lowest index has a lower priority than a slot with a highest index.

13. The MS of claim 11, wherein the controller is further configured to control the receiver to omit listening to at least one slot with a lower priority than the first slot, among at least one slot that precedes the first slot in terms of time.

14. The MS of claim 11, wherein the controller is further configured to control the transmitter to abandon sending of the first resource reservation message through the first slot, when the second resource reservation message is sent by another MS in at least one slot that precedes the first slot in terms of time.

15. The MS of claim 11, wherein the controller is further configured to control the transmitter to send the first resource reservation message through all slots constituting the resource reservation unit, when the MS desires continuous use of the transmission resource unit corresponding to the resource reservation unit, or when the MS desires to send an emergency disaster message through the transmission resource unit.

16. The MS of claim 11, wherein the controller is further configured to control the transmitter to;
  when no second resource reservation message is sent by another MS in a slot with a higher priority than the first slot in the resource reservation unit, send the first resource reservation message through a second slot selected from among a plurality of slots constituting an additional resource reservation unit that succeeds the resource reservation unit, and
  when no second resource reservation message is sent by another MS in a slot with a higher priority than the second slot in the additional resource reservation unit, transmit the data through the transmission resource unit.

17. The MS of claim 11, wherein the controller is further configured to select the resource reservation unit with a lower occupancy from among a plurality of resource reservation units by measuring signal strengths of the resource reservation units in the resource reservation channel.

18. The MS of claim 11, wherein the first slot is selected from the plurality of slots, using at least one of an identifier of the MS and a timing or clock inside the MS.

19. The MS of claim 11, wherein the controller is further configured to increase a number of slots in the resource reservation unit when multiple MSs select a same slot at a same time and priorities of the MSs cannot be distinguished.

20. The MS of claim 11, wherein the controller is further configured to allocate one or more resource reservation units for the transmission resource unit when multiple MSs select a same slot at a same time and priorities of the MSs cannot be distinguished.

* * * * *